Nov. 25, 1941.    H. W. SMITH    2,263,744
MANDREL BAR STEADIER
Filed Oct. 4, 1939    4 Sheets-Sheet 1
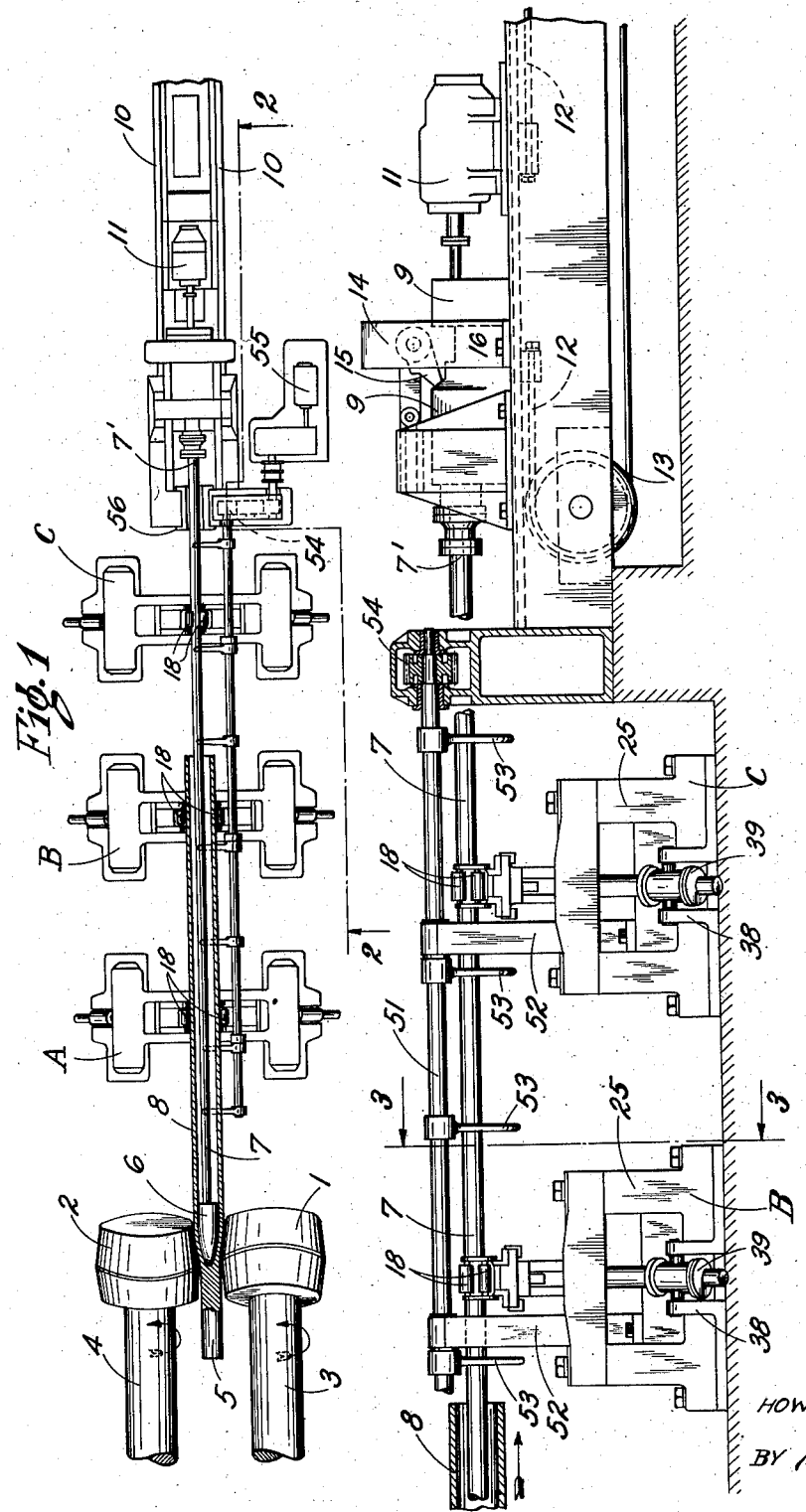
INVENTOR.
HOWARD W. SMITH
BY Richey Watts
ATTORNEYS Nov. 25, 1941.    H. W. SMITH    2,263,744
MANDREL BAR STEADIER
Filed Oct. 4, 1939    4 Sheets-Sheet 2
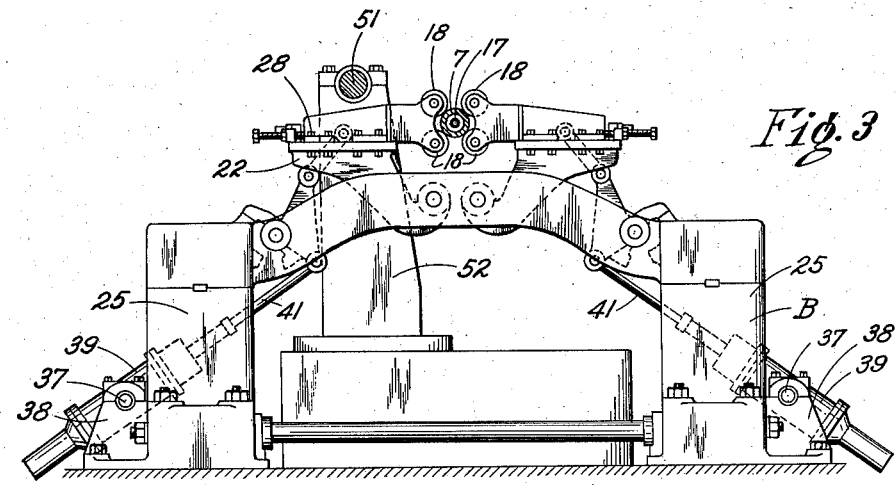
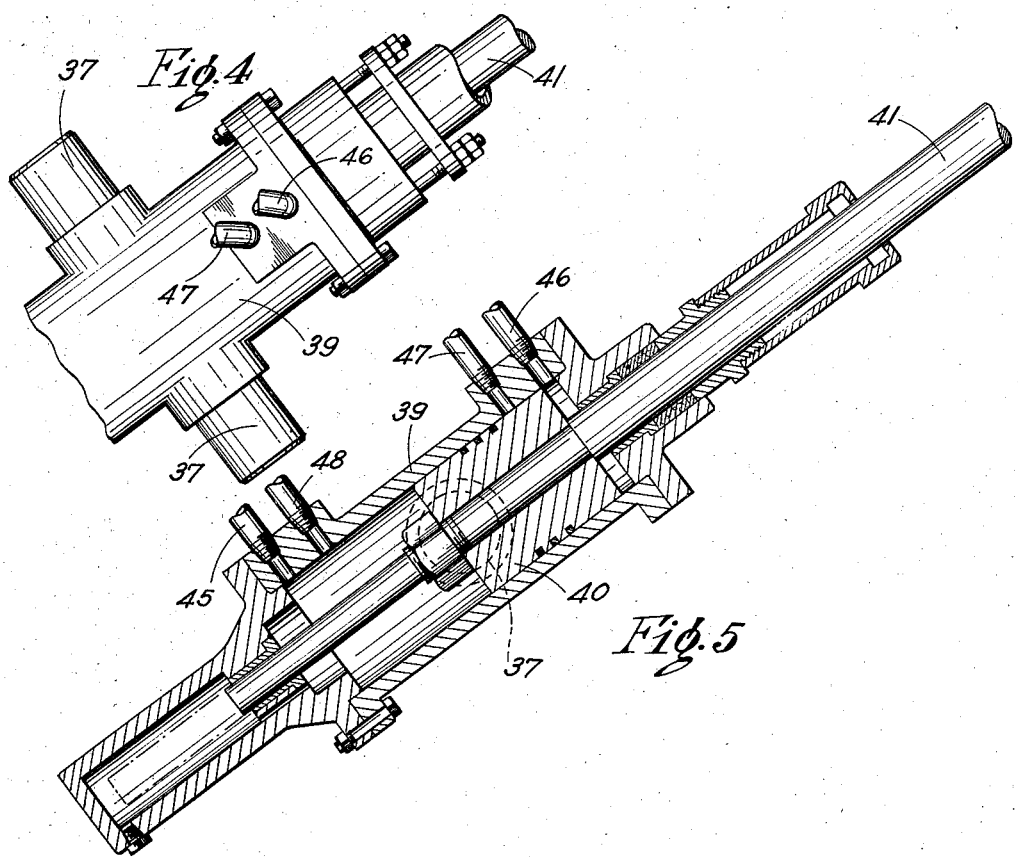
INVENTOR.
HOWARD W. SMITH
BY
Richey & Watts
ATTORNEYS

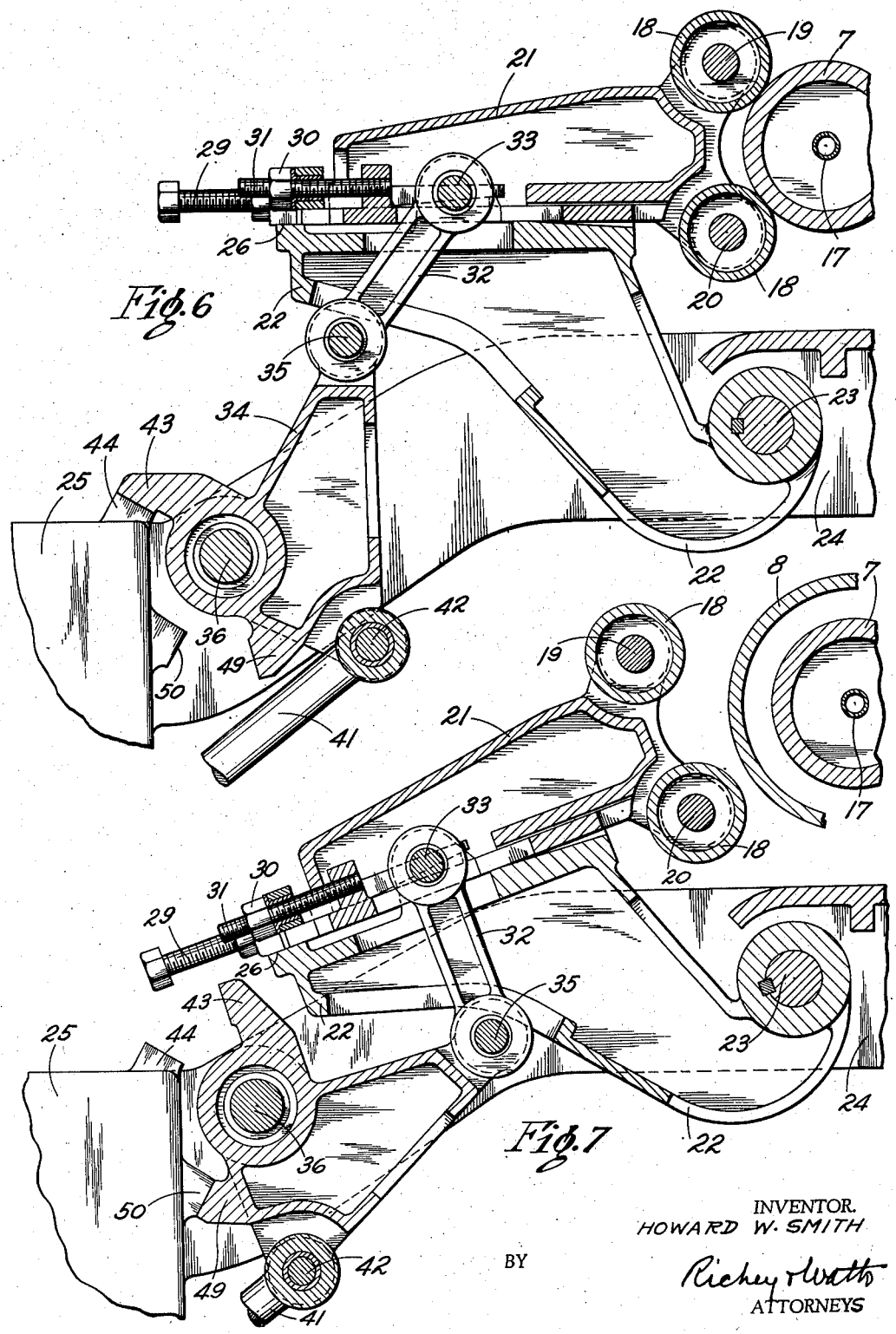

Nov. 25, 1941.                H. W. SMITH                    2,263,744
                          MANDREL BAR STEADIER
                           Filed Oct. 4, 1939           4 Sheets-Sheet 4

INVENTOR.
HOWARD W. SMITH
BY
ATTORNEYS

Patented Nov. 25, 1941

2,263,744

UNITED STATES PATENT OFFICE 2,263,744

MANDREL BAR STEADIER

Howard W. Smith, Ellwood City, Pa., assignor to The Aetna Standard Engineering Company, Youngstown, Ohio, a corporation of Ohio Application October 4, 1939, Serial No. 297,879

2 Claims. (Cl. 80—13)

This invention relates to the manufacture of seamless tubing and more particularly to certain improvements in apparatus for manufacturing tubing by the well known Mannesmann or Stiefel processes.

In the manufacture of seamless tubing the customary procedure is to pierce a billet by the action of a pair of angularly disposed driven rolls which cause a solid billet to feed over a piercing point or mandrel and be converted from solid into tubular form. This procedure is well known in the art and is extensively practiced. It is customary to support the piercing point or mandrel in proper position relative to the piercing rolls by means of a mandrel bar or rod which extends away from the rolls in the direction of tube movement a distance at least as great as the length of the longest tube to be formed on the mill. The supported end of the mandrel bar is rotatably attached to a suitable carriage or traveler whereby the bar may be withdrawn or retracted from the tube so that the tube can be moved away. The mandrel bar is then returned to working position by causing the carriage to travel toward the rolls, and the mill is ready to form another tube. Modern large capacity high speed seamless mills are adapted to handle tubes which may be up to 50 feet in length and as the tube diameters may run up to 18 inches or more, it will be understood that the bar which carries the mandrel must be a very long and heavy member. This bar must rotate with the tube during the piercing operation and, prior to my invention, difficulty had been experienced in preventing the unsupported length of the bar from whipping and vibrating with the resulting damage to its supporting structure and excessive wear and tear on the entire apparatus. Similar arrangements of rolls, mandrel and mandrel bar are also employed in reeling machines, which are generally similar in construction to piercing machines but are used to smooth the outside and inside surfaces of the tube before it is finished, and are also used in expanding machines and other equipment by which a tube is rolled circumferentially with a mandrel inside. It will be understood that where reference is made in this specification and the appended claims to seamless tube mills it is intended to include all equipment of this general type.

It is among the objects of the present invention to provide a mandrel bar support for seamless tube mills or the like whereby long lengths of tube can be pierced and handled without excessive vibration of the mandrel bar. Other objects of my invention include: the provision of a mandrel bar steadying mechanism for seamless tube mills whereby any length of mandrel rod can be accurately supported for vibrationless rotation and whereby an operator can readily control the mandrel bar supports to permit the passage of a tube over the mandrel; the provision of an improved mandrel bar support operating mechanism which provides a self-locking support for the mandrel bar whereby forces tending to cause the bar to vibrate cannot throw the supporting mechanism out of position; the provision of a rugged, simple and effective mandrel bar support mechanism for seamless tube mills which permits of increased speed of rotation of the mandrel bar and thus enables more rapid piercing to be effected.

The above and other objects of my invention will appear from the following description of several embodiments thereof, reference being had to the accompanying drawings, in which—

Figure 1 is a somewhat diagrammatic plan view of a piercing mill equipped with my bar steadying device;

Figure 2 is an enlarged side elevation, partly in cross-section, taken substantially on line 2—2 of Figure 1, illustrating a tube end advancing toward the bar steadying apparatus which is in bar steadying position;

Figure 3 is a transverse vertical cross-sectional view taken on the line 3—3 of Figure 2;

Figure 4 is an enlarged fragmentary view of one of the operating cylinders for the bar steadying rolls;

Figure 5 is a detached cross-sectional view of one of the operating cylinders and the piston carried thereby;

Figure 6 is an enlarged fragmentary cross-sectional view of one unit of the operating linkage and bar steadying mechanism of the apparatus of Figures 1, 2 and 3, with the rolls engaging the mandrel bar;

Figure 7 is a view generally similar to Figure 6, but showing the bar steadying rolls in retracted position;

Figure 8:
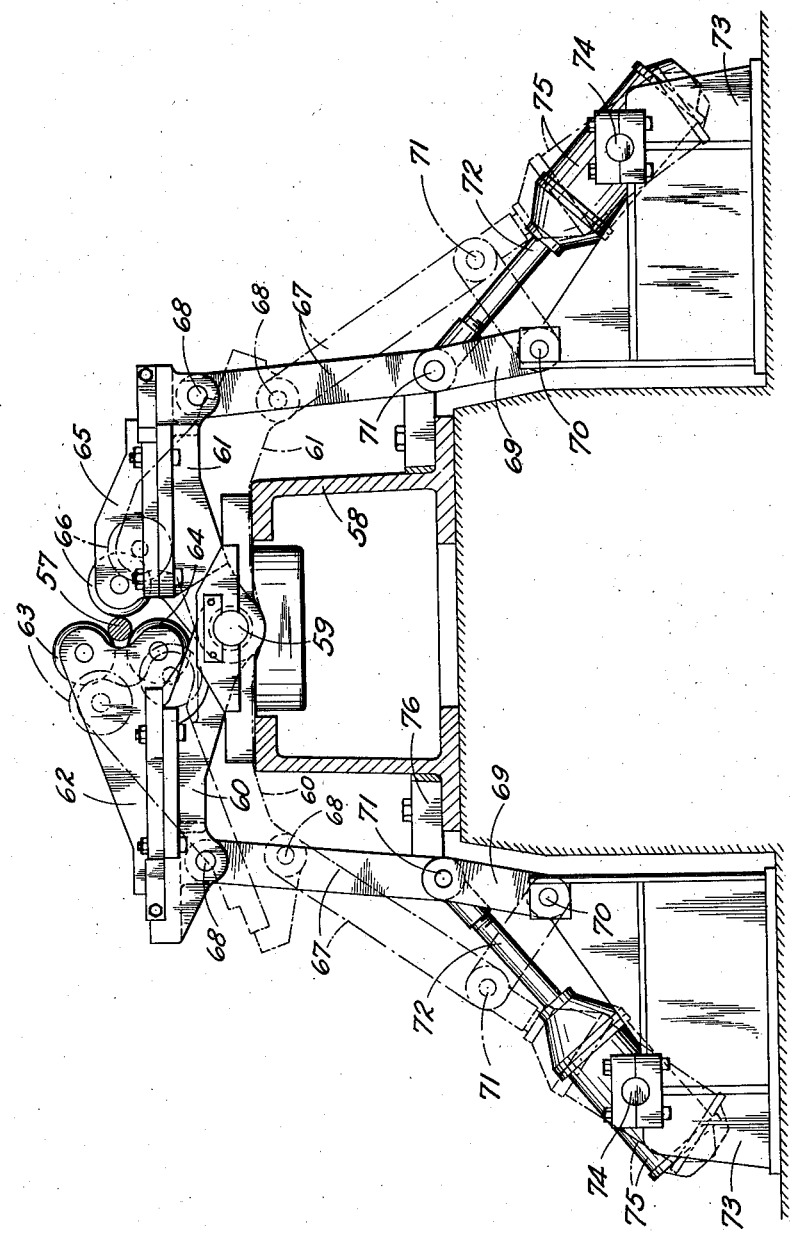
Figure 8 is a transverse vertical cross-sectional view of a modified bar steadying mechanism, particularly adapted for use with small mandrel bars.

In Figure 1 the piercing rolls 1 and 2 are driven by shafts 3 and 4 and rotate in the same direction, as indicated by the arrows. A billet 5 is fed to the pass between the rolls 1 and 2 by any suitable means (not shown). The center of the end of the billet is punched before it is fed to the rolls 1 and 2 and this center engages the pointed end of the mandrel 6 which is removably carried on the end of the mandrel rod or bar 7. As the angularly arranged rolls 1 and 2 rotate they distort the metal of the billet 5 and cause it to flow over the point of the mandrel 6 and assume a tubular form as seen at 8. The mandrel bar 7 extends away from the rolls 1 and 2 a distance sufficient to accommodate the longest tube which will be formed on the mill.

The outer end 7' of the bar 7 is secured to the traveling carriage 9 which is suitably mounted on slides or tracks 10. The carriage 9 includes a thrust bearing for the mandrel bar 7 which permits rotation of the bar and which takes the thrust caused by the pressure of the billet against the mandrel 6 during the piercing operation. A motor 11 is mounted on the carriage 9 and is connected through suitable gearing (not shown) to drive the mandrel bar 7. The function of the motor 11 is to bring the mandrel bar 7 up to proper rotational speed prior to engagement of the mandrel 6 by a billet which is to be pierced. During the piercing operation the mandrel bar 7, mandrel 6, and billet 5 all rotate at the same speed and, in order to avoid the necessity of having the billet pick up the mandrel and mandrel bar and start them rotating when they are engaged by the billet, it is customary to provide means such as the motor 11 to start the mandrel bar rotating and bring it up to proper speed before it is engaged by the billet.

A cable or the like 12 may be secured at its ends to the carriage 9 and passes over a fixed pulley 13. Another similar pulley (not shown) is disposed at the other end of the trackway 10 and any suitable means may be provided for exerting a force on the cable causing the carriage 9 to slide back and forth on the trackway 10, thus moving the mandrel bar 7 into and out of piercing position. A bridge structure 14 extends across the trackway 10 over the carriage 9. This carries a locking dog or latch 15 which engages an abutment 16 on the carriage 9, as is seen in Figure 2. Thus the thrust against the bar 7 is absorbed by the latch 15 and its supporting frame. This latch 15 is moved out of engagement with the surface 16 just prior to retracting the carriage 9 and bar 7 to withdraw the mandrel bar from a tube which has been pierced by the rolls 1 and 2.

As has been explained above, in modern seamless tube mills the mandrel bar 7 may be 50 feet or more in length and may be 10 to 15 inches in diameter. If this length of bar be unsupported during its high speed rotation, it may whip and vibrate to such an extent that damage to itself and other parts of the mechanism will result. Furthermore, without support, the mandrel end of the bar 7 and the mandrel 6 could not be maintained in proper position so that the point of the mandrel would engage the center of the on-coming billet due to the natural deflection of the unsupported bar. In order to overcome these difficulties I have provided a plurality of bar steadying devices which are indicated generally at A, B, C in Figure 1. These devices are all alike and each is adapted to steady and lock the bar against undesired vibration while permitting free rotation. Briefly they comprise bar engaging members, preferably rollers, which are adapted to be moved into position to grip and lock the bar to hold it on its normal and proper center line, and to be withdrawn at will from bar steadying position to permit the tube end to pass by.

In the operation of a mill equipped with my bar steadiers, the operator, who is stationed in a position where he can closely see the progress of the tube, watches the tube as it advances over the mandrel and comes out along the bed of the mill. Just before the on-coming tube end arrives at the bar steadier A, the operator causes the steadying rolls to be retracted, permitting the tube end to pass by. In like manner the operator opens the bar steadying rolls of the mechanisms B and C successively and just prior to the time when the tube end would strike the steadying mechanism. Thus, prior to and for a period after the engagement of the billet with the mandrel 6, the bar 7 is steadied at three spaced points along its length and certain support is provided for the bar until the tube piercing operation is substantially completed. After the piercing is completed the carriage 9 is retracted, withdrawing the bar from the inside of the tube and causing the mandrel 6 to drop off the end of the bar into a suitable receptacle. With the bar 7 retracted the tube which has just been formed can be kicked off transversely of the machine on to a cooling pit or conveyors which will take it to another set of rolls or other mechanism.

Having described, in a general way, the operation of my improved bar steadying mechanism, I will now describe in detail a preferred embodiment thereof.

As is seen in Figure 3 the mandrel bar 7 is preferably of hollow tubular construction and houses a cooling water pipe 17 which carries cooling water from any suitable source to a point adjacent the mandrel 6, thus preventing overheating of the mandrel and bar. In Figure 3 the bar steadying rolls 18 of the unit B are in engagement with the bar 7. The four rolls 18 are spaced circumferentially around the bar 7 and thus effectively prevent vibration or whipping of the bar.

Each of the bar steadying units A, B and C comprises a pair of substantially identical mechanisms, one of which is effective to support and operate the steadying rolls 18 on one side of the bar and the other to support and move the steadying rolls 18 on the other side of the bar. As these mechanisms are entirely similar, except for the fact that one is left hand and the other is right hand, only the left hand mechanism (Figure 3) will be described in detail, and similar reference characters will be used to indicate similar parts on the right hand bar steadier mechanism.

The rolls 18 are supported for free rotation on shafts 19 and 20, which in turn are supported on an adjustable head member 21. The main supporting arm 22 is rotatably supported on a shaft 23 carried by the overhanging arch member 24 of the bar steadier supporting base or frame structure indicated at 25. The head 21 is normally secured in fixed position on the top face 26 of the arm 22 by means of suitable clamp screws 28 (Figure 3). In order to accommodate mandrel bars of different diameters provision is made for sliding the head 21 laterally on the face 26 of the arm 22. This is accomplished by loosening the screws 28 and adjusting the screw 29 and the nut 30, the latter having engagement with the screw 31 carried by the sliding head 21, until the desired lateral position of the rolls 18 is obtained. The clamp screws 28 are then again tightened to retain the head 21 in adjusted position.

The toggle link 32 has one end pivotally secured to the arm 22 at 33 and its other end pivotally connected to the second operating toggle link 34 by a pin 35. A fixed pivot shaft 36 is carried on the frame 25 and provides a pivotal support for the opposite end of operating toggle link 34. Supported on trunnions 37, which have suitable bearings at 38 in the lower part of the frame 25, is the bar steadier operating cylinder 39. This cylinder is shown in detail in Figure 5 and the piston 40, which operates in the cylinder 39, carries a piston rod 41, the outer end of which is pivotally secured to the operating toggle link 34 at 42. It will be observed that the location of the point of connection of the piston rod 41 to the toggle link 34 provides a bellcrank arm whereby a push or pull on the rod 41 will cause the toggle arm 34 to swing about its fixed pivot 36. The arm 34 also carries a projecting stop portion 43 which engages a lug 44 on the frame 25 when the toggle linkage is in bar engaging position (see Figure 6).

In the operation of the above described mechanism, fluid under pressure, such as compressed air or steam, is controlled by suitable valves (not shown) and, when it is desired to cause the steadying rolls 18 to move into steadying position, as shown in Figure 6, fluid under pressure is admitted to the lower end of cylinder 39 through the inlet port 45. At the same time the inlet port 46 for the opposite end of the cylinder and the exhaust port 48 is closed. Exhaust port 47 remains open. The pressure is effective against the piston 40 to move it into the position shown in Figure 5. This exerts a force on the piston rod 41 moving the toggle arm 34 in counter-clockwise direction into the position shown in Figure 7 where the stop 43 engages the lug 44. It will be understood that the adjustable head 21 will be so positioned that when the stop 43 strikes the lug 44 the rolls 18 will just contact the bar 7 and will give it the desired steadying support without exerting unnecessary pressure thereon.

When the parts are in bar steadying position as shown in Figure 6, the center of the connection 35 between the toggle links 32 and 34 lies on the left hand side of a line drawn between the pivot pins 33 and 36. Thus an effective lock is obtained and any force exerted against the rolls 18 will merely tend to force the stop 43 against the lug 44 and there will be no tendency to break the toggle and permit the rolls 18 to move away from their steadying position.

When it is desired to move the rolls 18 out of steadying position into retracted position (shown in Figure 7) in order to permit the end of the on-coming tube to pass over the mandrel bar, it is only necessary to change the connections to the cylinder 40 to admit fluid under pressure through the port 46 and permit the other end of the cylinder to exhaust. The resulting downward movement of the piston 40 in the cylinder 39 will cause the piston rod 41 to act through the bell crank arm of the lever 34 to break the toggle formed by the links 32 and 34. This will cause the arm 22 to be swung about its fixed support 23 into the position shown in Figure 7 in which the rolls 18 are sufficiently clear of the mandrel bar 7 to permit free passage of the tube thereover. To move the rolls 18 back into steadying position merely requires the reversal of the valve connections whereby the fluid pressure is applied to the bottom end of the cylinder 39. As this cylinder is mounted on trunnions 37, as described above, the piston rod 41 may be a rigid member and the pivoting of the cylinder on its trunnion support will take care of the swinging movement of the outer end of the piston rod 41 as the arm 34 moves about its fixed pivot 36.

A second stop member 49 is formed on the arm 34 and is adapted to engage the lug 50 on the frame 25 to limit the movement of the mechanism in retracting direction. By means of the two stops 43 and 49 and their co-acting lugs 44 and 50, positive limits are imposed upon the movement of the roll carrying arm 22. The arrangement of the inlet and exhaust ports at the ends of the cylinder 39 provides a cushion at each end of the piston stroke in a well known manner and this assists in slowing up the parts just before the stops 43 and 49 engage their respective lugs. With my adjustable roll carrying head 21 and the fixed swing of the arm 22 I am able to accommodate various sizes of mandrel rods without the necessity of changing the main operating linkage of the mechanism by simple adjustment of the position of the sliding head 21.

As explained above the rolls 18 on the right hand side of the bar 7 are supported and operated by a mechanism which is substantially identical to that just described. The two cylinders 39 of Figure 3 preferably have their fluid pressure connections leading to the same valve mechanism (not shown), whereby both the right and left hand cylinders 39 and their pistons and piston rods 40 and 41 are operated simultaneously to move the left hand rolls 18 and the right hand rolls 18 simultaneously into and out of bar steadying position.

It will be understood that in addition to my improved bar steadying mechanism the mill will be equipped with other necessary or desirable devices. One of these is the kick-off mechanism which includes a shaft 51 extending parallel to the mandrel bar 7 and supported on vertically extending columns 52. This shaft carries a plurality of depending kick-off arms 53 and is connected at its outer end through gearing, indicated at 54, to a driving motor 55 (see Figure 1) whereby, after the mandrel bar 7 has been withdrawn from the tube, the shaft 51 can be rotated and the arms 53 caused to engage the tube and roll it laterally on to a suitable table or conveyor. A stripper, which comprises a suitably supported member 56 adapted to engage the outer end of the tube 8, is located adjacent the gear box 54. This stripper provides an abutment against which the end of a finished tube will strike as a pull is exerted on the bar 7 and the mandrel 6 when the carriage 9 is retracted. This stripper member provides the resistance necessary to free the mandrel bar from the mandrel or piercing point and withdraw it from the tube and retains the tube in position on the mill run-out bed so that it can be kicked off by the arm 53 after the bar 7 is completely withdrawn.

Figure 8 illustrates a modified form of my invention, particularly adapted for use with relatively small mandrel bars such as the solid bar 57. The base 58 supports a shaft 59 on which the two similar arms 60 and 61 are mounted. The arm 60 carries a head 62 which in turn supports the two mandrel engaging rollers 63 and 64. A generally similar head 65 is carried on the arm 61, but this latter head member carries only a single mandrel engaging roller 66. By means of this three-roll support it is possible to prevent vibration of even a very small diameter mandrel bar. The mechanism for operating the arm 60 is the same as that for operating the arm 61, except that one is left hand and the other is right hand. Only the operating mechanism for the arm 60 will be described and similar reference characters will be applied to similar parts of the apparatus employed to oscillate the arm 61 about the common pivot shaft 59. In Figure 8 the bar engaging and supporting positions of the parts are shown in full lines, while the retracted positions of the mandrel bar supports are shown in dot and dash lines.

A toggle link 67 is pivoted at 68 to the arm 60. A second toggle link 69 has a fixed pivotal support at 70 and its upper end is pivotally connected at 71 to the lower end of the toggle link 67 to form the center joint of the toggle linkage. The point 71 also is pivotally connected to the end of the piston rod 72. A bearing support for the trunnions 74 on cylinder 75 is provided by the frame or base 73. A suitable piston (not shown) is disposed in the cylinder 75 and secured to the piston rod 72. Fluid pressure connections, preferably similar to those shown in Figure 5, are employed to conduct operating fluid pressure to and from the cylinder 75.

When pressure is applied against the lower end of the piston carried by the piston rod 72 the toggle formed by the arms 67 and 69 is straightened out and moved into the position shown in full lines in Figure 8. When in this position the rolls 63 and 64 are in mandrel bar guiding position and the center joint 71 of the toggle is just beyond the straight line position of the toggle arms 67 and 69. A stop 76 prevents further movement of the arms 67 and 69 in mandrel bar engaging direction and any force against the rolls 63 and 64 will merely tend to cause the arm 67 to engage the stop 76 and will not tend to break the toggle.

When the fluid pressure connections to the cylinder 75 are reversed the piston rod 72 will be withdrawn into the cylinder, the toggle will be broken (that is, moved through its straight line position) and the arm 60 will be swung downwardly about its pivot 59 to move the rolls 63 and 64 out of mandrel engaging position. It will, of course, be understood that both the right and left hand mandrel bar support mechanisms will be operated simultaneously and that the apparatus of Figure 8 possesses the same advantages as the previously described embodiment of my invention.

Although I have described the illustrated embodiments of my invention in considerable detail, it will be understood by those skilled in the art that numerous variations and modifications may be made in the form of apparatus employed to carry out the teachings of my invention. I do not, therefore, wish to be limited to the particular structures herein shown and described, but claim as my invention all embodiments thereof coming within the scope of the appended claims.

I claim:

1. In mandrel bar steadying mechanism for seamless tube mills or the like, a mandrel bar, a frame or base structure disposed adjacent the working position of the mandrel bar, a pair of arms having pivotal support on said frame, mandrel bar engaging means carried by each of said arms and adapted to engage the bar at circumferentially spaced points, a toggle linkage connected to said frame and to one of said arms, a second toggle linkage connected to said frame and the other of said arms, and independent fluid pressure actuated means for operating said toggle linkages whereby said arms, when in one position, are locked in bar steadying relation to said bar, and when in another position are completely retracted from said bar.

2. In mandrel bar steadying mechanism for seamless tube mills or the like, a mandrel bar, a frame or base structure disposed adjacent the working position of the mandrel bar, a pair of arms having pivotal support on said frame, mandrel bar engaging means carried by each of said arms and adapted to engage the bar at circumferentially spaced points, a toggle linkage connected to said frame and to one of said arms, a second toggle linkage connected to said frame and the other of said arms, independent fluid pressure actuated means for operating said toggle linkages whereby said arms, when in one position, are locked in bar steadying relation to said bar and when in another position are completely retracted from said bar, said fluid pressure actuated means including cylinders, pivotal supports for said cylinders, pistons in said cylinders and piston rods extending from said pistons and operatively connected to said toggle linkages.

HOWARD W. SMITH.